(12) United States Patent
Ketsdever et al.

(10) Patent No.: US 6,263,665 B1
(45) Date of Patent: Jul. 24, 2001

(54) MICROTHRUSTER FOR HEATING A PROPELLANT, DRIVING THE VAPORS PRODUCED TO A DISCHARGE SECTION

(75) Inventors: Andrew D. Ketsdever, Alta Loma; Eric P. Muntz, Pasadena, both of CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 0 days.

(21) Appl. No.: 09/326,249

(22) Filed: Jun. 4, 1999

Related U.S. Application Data (60) Provisional application No. 60/088,105, filed on Jun. 5, 1998.

(51) Int. Cl.$^7$ .................... G21D 1/00; H05B 1/00
(52) U.S. Cl. ........................................... 60/203.1
(58) Field of Search ................... 60/203.1, 200.1

(56) References Cited

U.S. PATENT DOCUMENTS 4,322,946 * 4/1982 Murch et al. ............... 60/203.1

* cited by examiner

Primary Examiner—Timothy S. Thorpe
Assistant Examiner—W Rodriquez
(74) Attorney, Agent, or Firm—Thomas C. Stover

(57) ABSTRACT

The invention provides a microthruster which includes a housing having a propellant container and a discharge section, means to heat the propellant to drive vapors toward the discharge section, a heating element to heat the vapors and one or more ports to discharge the vapors to provide thrust. Further provided is a method for powering a microthruster by flowing gas in free molecular flow therein so that a plurality of molecules of the gas contact a heating element before discharge from the microthruster.

18 Claims, 7 Drawing Sheets

LEGEND
10. Propellant tank
12. Valve
13. Particulate Filter
14. Gas Plenum
15. Insulation Layer
16. Heated Pedestal
17. Propellant Feed Slot
18. Thin Film Heating Element
19. Expansion Slot
20. Expansion Slot Plate
21. Typical Propellant Molecule Trajectory
22. Propellant Tank Strip Heater
23. Stagnation Chamber

MICROTHRUSTER FOR HEATING A PROPELLANT, DRIVING THE VAPORS PRODUCED TO A DISCHARGE SECTION

This Appln claims the Benefit of Provisional No. 60/088,105 filed Jun. 5, 1998.

STATEMENT OF GOVERNMENT INTEREST

The invention described herein may be manufactured and used by or for the Government for governmental purposes without the payment of any royalty thereon.

BACKGROUND OF THE INVENTION

1. Field of the Invention

This invention relates to thrusters for spacecraft, particularly compact thrusters.

2. Description of Related Art

Most micropropulsion systems in use today consist of cold gas thrusters which use propellants stored in gaseous form such as molecular nitrogen or helium. Gaseous propellant is stored at high pressures (10's of GPa) in volumetrically large, heavy titanium or graphite composite tanks. The propellant storage and thruster nozzle are typically separated by a complex valve system and perhaps a pressure regulator to reduce the gas pressure to the nozzle. Because the propellant is stored at very high pressures, the valve is typically very large in size to reduce valve leakage. These valves also typically require several Watts of power to actuate. The nozzle throat diameter for a cold gas thruster for a microsatellite mission can be on the order of 10 $\mu$m. This makes the cold gas thruster susceptible to particulate contamination plugging of the nozzle. For variable thrust missions, the operating pressure of the thruster can be regulated; however, this comes at the expense of efficiency in terms of specific impulse or thrust per unit propellant mass flow.

In other prior art is U.S. Pat. No. 5,836,150 to Garcia (1998) which relates to micropropulsion but by combustion, with attendant problems of corrosive gases at high pressures in the thruster.

Accordingly, there is need and market for a compact thruster that overcomes the above prior art shortcomings.

There has now been discovered a compact thruster that is capable of efficiently operating over a wide range of thrust levels.

SUMMARY OF THE INVENTION

Broadly the present invention provides a microthruster which includes a housing having a propellant container and a discharge section, means to heat the propellant to drive vapors toward the discharge section, a heating element to heat the vapors and one or more ports to discharge the vapors to provide thrust.

Also the invention provides a method for powering a microthruster by flowing propellant vapors in free molecular flow therein so that a plurality of vapor or gas molecules contact a heating element before discharge from the microthruster.

Definitions:

By propellant "vapor", as used herein, is meant a vapor that is equally termed a gas and includes gas molecules.

By the "free molecule condition" or "free molecular flow", as used herein, is meant a flow of gas molecules in a thruster that collide with each other less often than with surfaces inside of a thruster including a vapor heating element.

BRIEF DESCRIPTION OF THE DRAWINGS

The invention will become more apparent from the following detailed specification and drawings in which.

DESCRIPTION OF PREFERRED EMBODIMENTS

Figure 1:
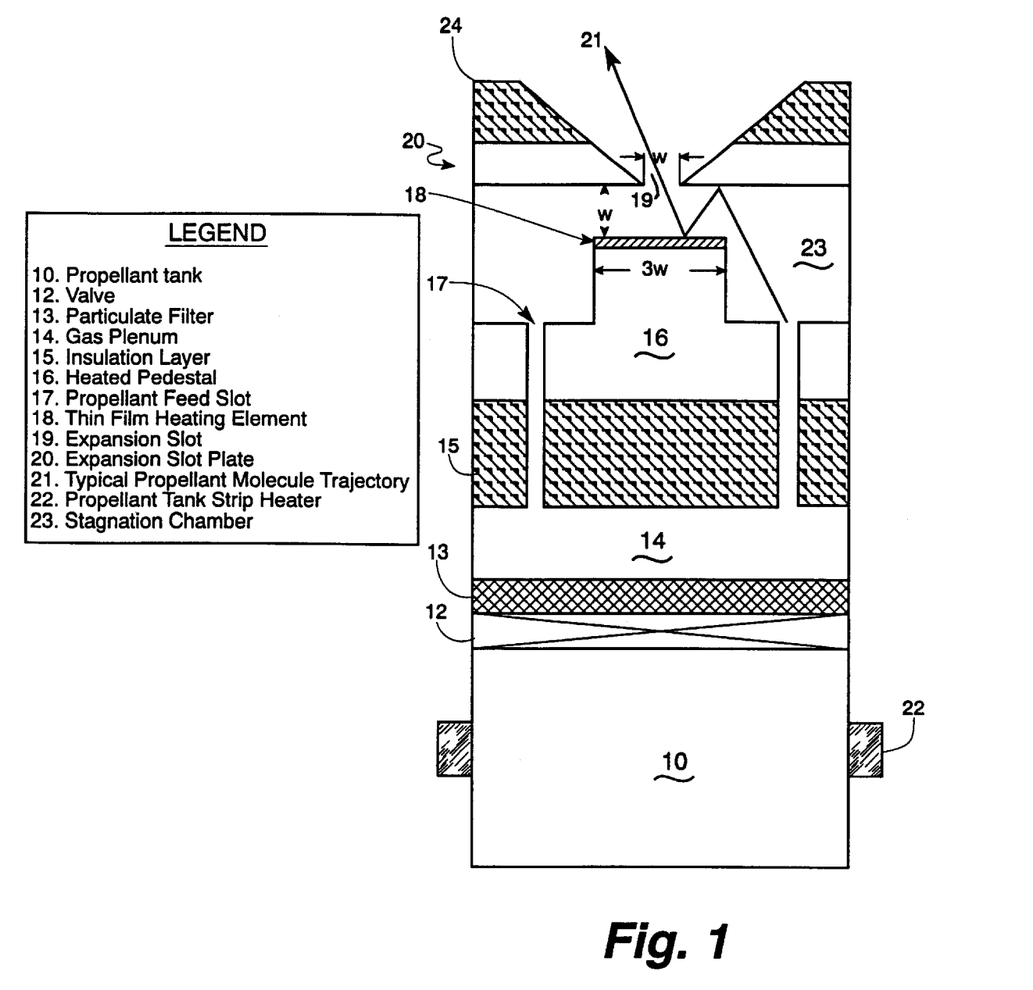
FIG. 1 is a sectional elevation schematic view of a compact thruster embodying the present invention.
Figure 2:
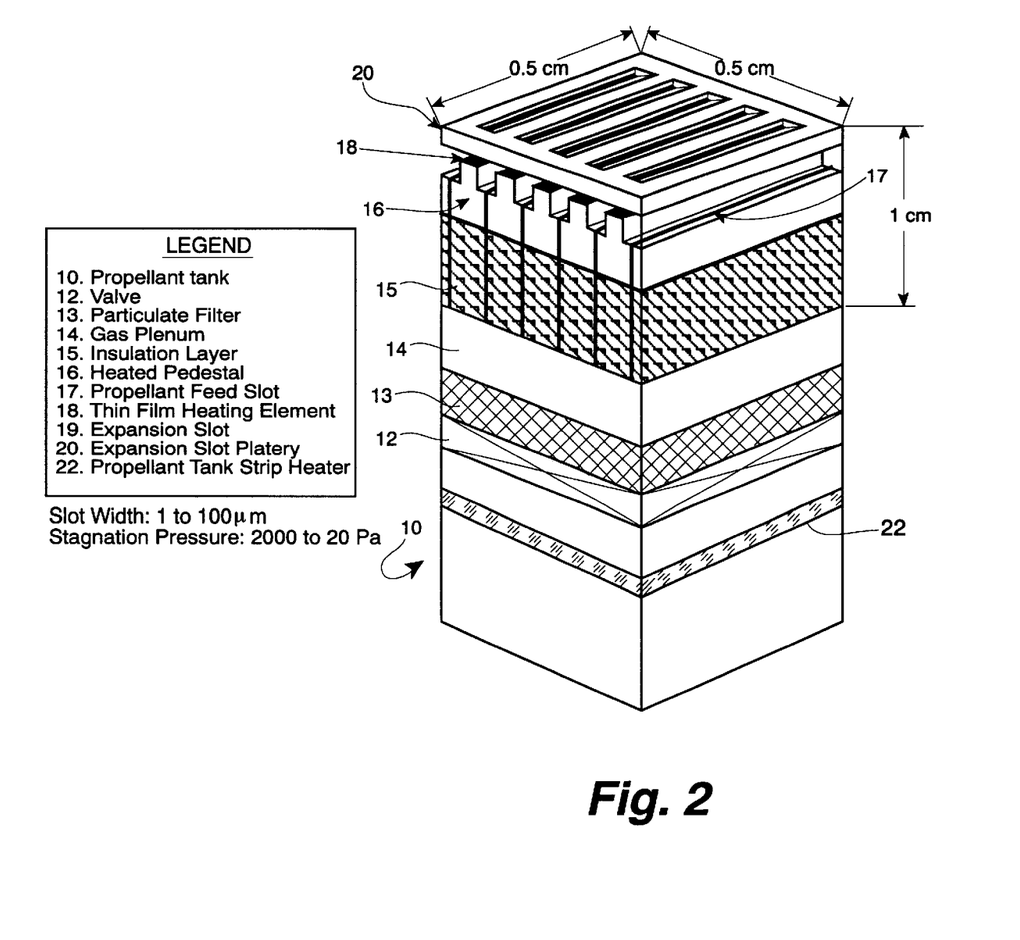
FIG. 2 is a perspective view of the compact thruster shown in FIG. 1.

Referring in more detail of the drawings, the compact thruster of the invention operates as follows per FIGS. 1 and 2. Propellant, in liquid or solid form, is stored in a propellant tank 10. When the thruster is to be operated, the valve 12 is opened and gaseous propellant flows through a filter 13 to remove any large particulates into a gas plenum 14. The operating pressure for the thruster is regulated by heating the propellant storage tank with a small heater 22 and operating at the appropriate vapor pressure for the propellant of choice (typically ammonia or water). The plenum feeds gaseous propellant into the stagnation region 23 through several propellant feed slots 17 machined in an insulating surface 15 and the heating element pedestal plate 16. The insulating surface 15 reduces the conductive heat transfer between the heating element pedestal plate 16 and the structure below. The pedestal plate 16 is designed to reduce the line-of-sight escape of a typical propellant molecule through the expansion slot 19 without first striking the heating element 18. The nominal stagnation pressure is determined by the expansion slot 19 width, w, such that the stagnation Knudsen number based on the slot width is approximately 1, imposing the free molecule condition.

Propellant entering the stagnation region 23 strikes the heating element 18 and exits the thruster through the expansion slot 19 as shown by the sample trajectory 21. Per FIG. 1, the heating element 18 width was found to be optimized at approximately 3w in numerical simulations. The distance between the heating element 18 top surface and the expansion slot 19 is approximately the slot width, w, ensuring that the propellant molecule does not suffer a collision with another propellant molecule before expanding throught the slot 19. The slot plate 20 is made as thin as possible to reduce heat loss to the expansion walls. The slot plate 20 is coated with an insulating material 24 to reduce radiative heat loss to the surrounding space. Sample dimensions of the compact thruster of the invention are given in FIG. 2 but such dimensions, can of course, vary with mission requirments.

Figure 6:
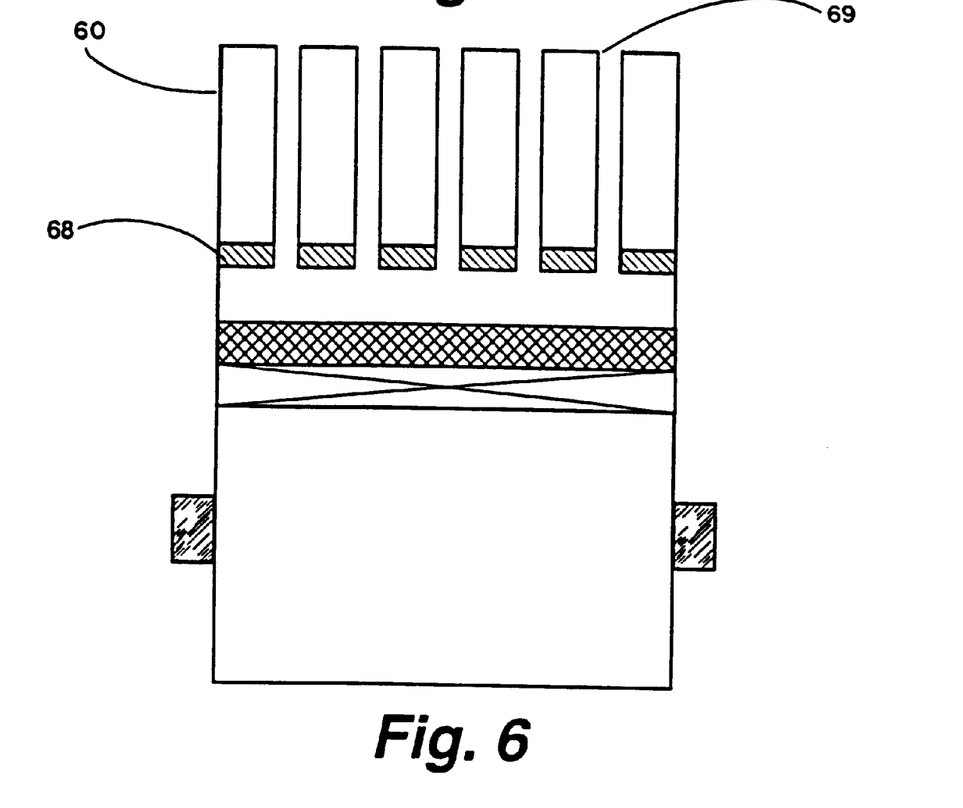
FIG. 6 is a sectional elevation schematic view of again another compact thruster embodiment of the invention.
Figure 7:
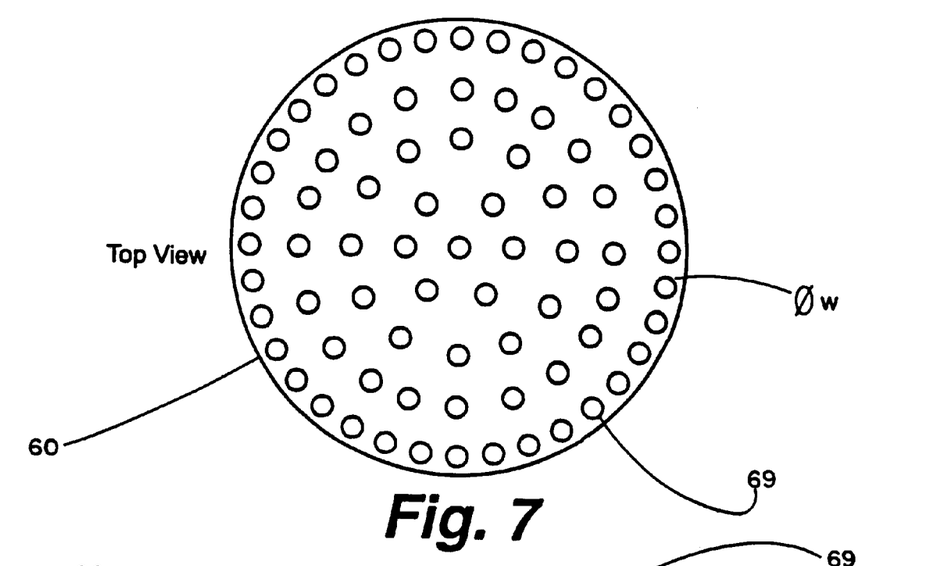
FIG. 7 is plan view of the compact thruster shown in FIG. 6.

The major alternative modes of the invention deal with the configuration of the heating element 18 with the expansion slot 19. These alternatives include heated slot walls (FIG. 3), heated baffles (FIG. 4), V-shaped heating element pedestals (FIG. 5) and heated large length to diameter (1/d)

tubes (FIGS. 6 & 7). These configurations are added for the benefit of improved propellant gas heating efficiency and to reduce energy losses to the expansion walls.

Figure 3:
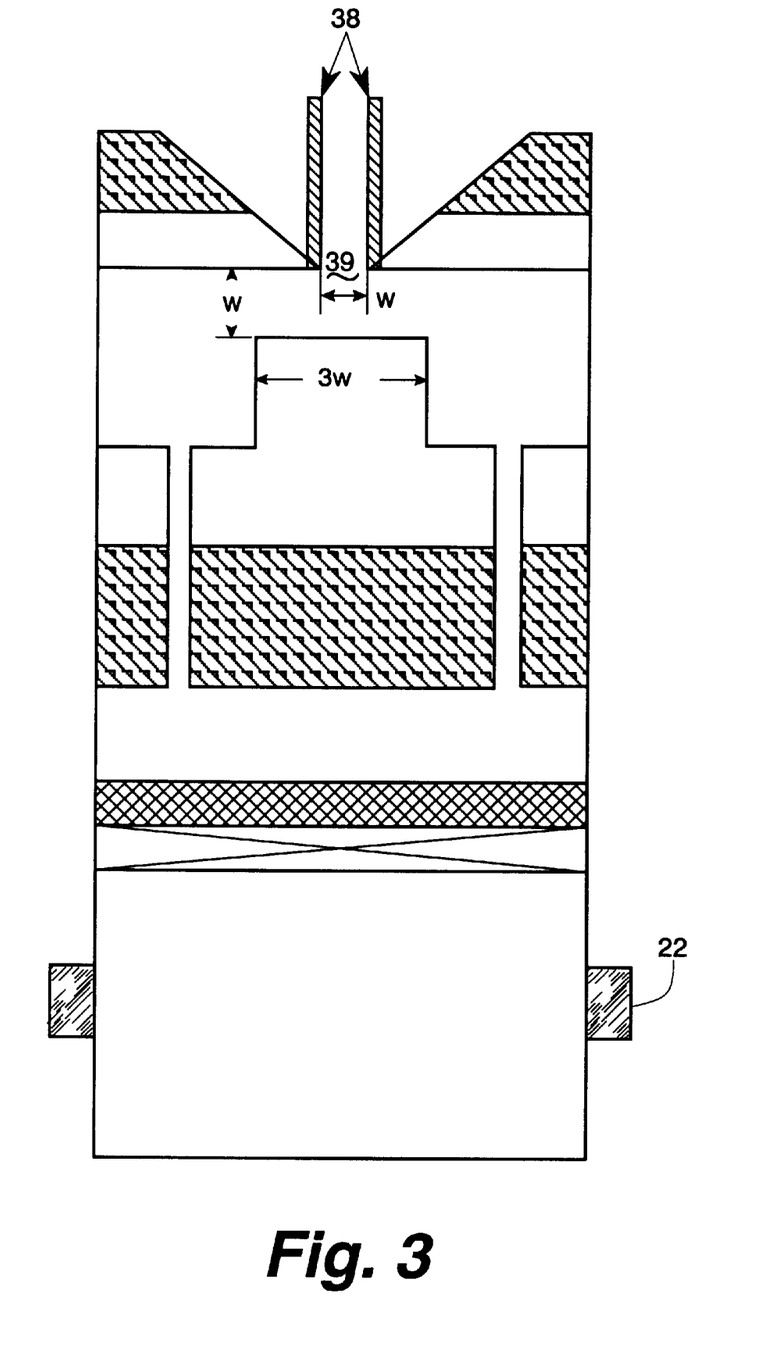
FIG. 3 is a sectional elevation view of another compact thruster embodiment of the present invention.

In FIG. 3, the walls of expansion slot 39 are perpendicular and lined with thin film heating elements 38. This configuration reduces the amount of energy lost to unheated expansion slot walls and can be more efficient in coupling energy to the propellant through multiple collisions with the heater elements. The remaining parts of the thruster are as indicated in the previous configuration.

Figure 4:
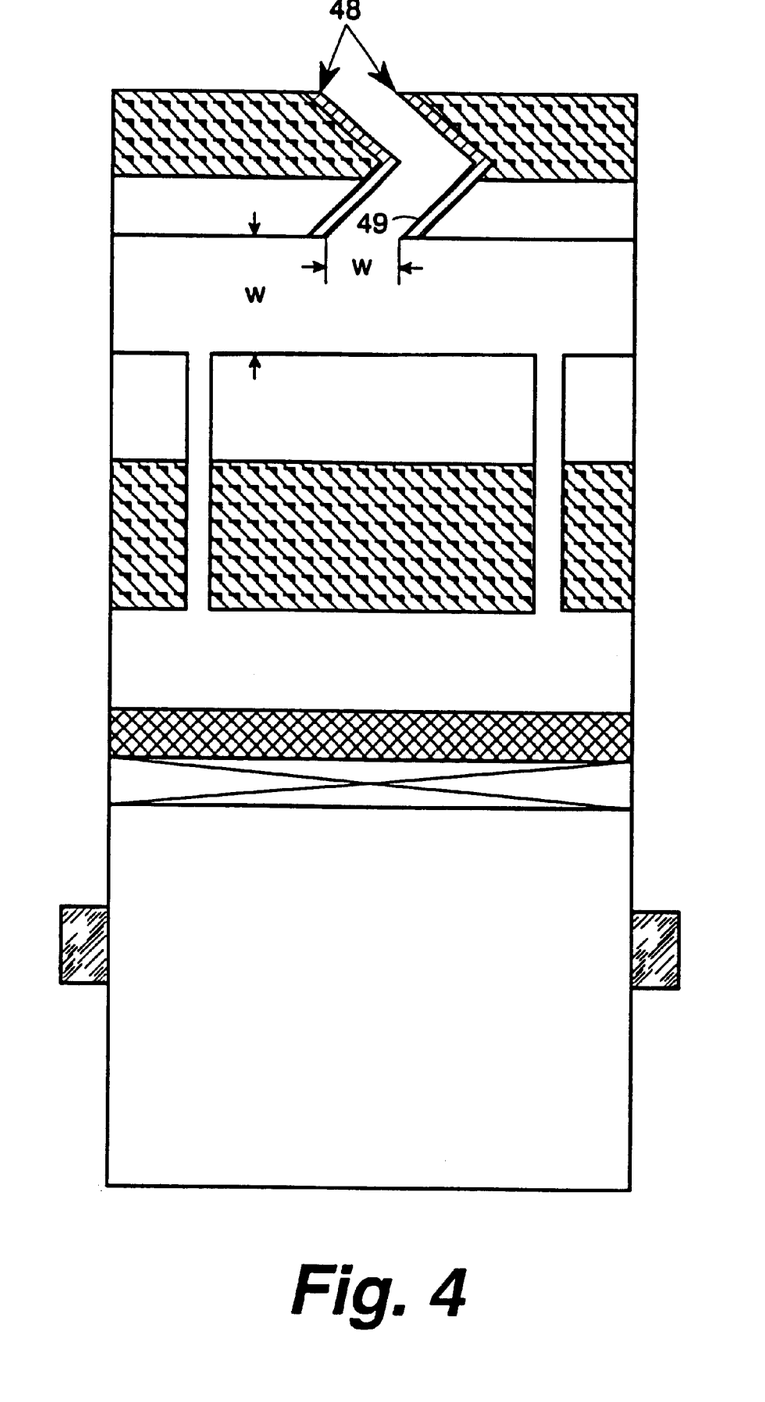
FIG. 4 is a sectional elevation schematic view of yet another compact thruster embodiment of the invention.

In FIG. 4, the expansion slot 49 is baffled such that line-of-sight escape ot the propellant molecules can not take place. This increases the heating efficiency of the propellant since a typical propellant molecule must strike the thin film heating elements 48 before exiting the thruster. The remaining parts of the thruster are as indicated in the previous configuration.

Figure 5:
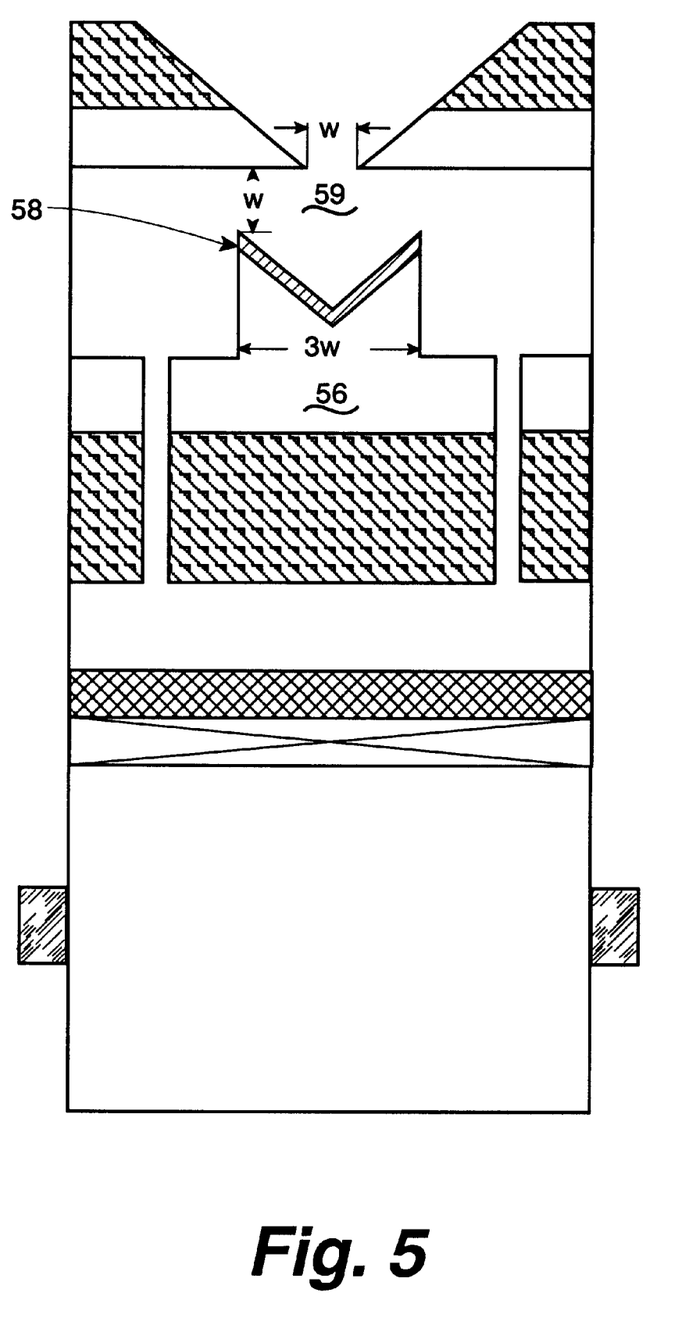
FIG. 5 is a sectional elevation schematic view of still another compact thruster embodiment of the invention.

In FIG. 5, the heated pedestal 56 and heating element 58 are V shaped so as to focus the reflecting molecules at the expansion slot 59. The pedestal can be cylindrical or V shaped to accomplish this task. The remaining parts of the thruster are as indicated previously.

In FIGS. 6 & 7, the expansion slot is replaced by several expansion orifices 69 of a diameter w. The entire expansion orifice plate 60 is heated by the thin film heating element 68. This confriguration is similar to the alternative shown in FIG. 3; however the expansion is through small orifices instead to the usual slot configuration. The remaining parts of the thruster are as indicated in the previous configuration.

In sum, the compact thruster of the invention is capable of a wide range of thrust levels. The nominal case is defined by w=100 microns, $p_o$=53 Pa, $T_w$=600K and the use of a water propellant.

Thus in a nominal case ($T_w$=600 K, $T_o$=300 K) with a slot length of, .eg., 1 cm, the compact thruster of the invention produces a thrust of approximately 0.025 mN per slot. Therefore, a thruster arrangement of 10 slots produces a total thrust of 0.25 mN at a heated wall temperature of 600 K. For applications which require large thrust levels, the stagnation pressure, the stagnation wall temperature and the total number of slots, can all be increased to achieve the desired thrust level. For further discussion see a paper entitled: *Free Molecule Micro-Resistojet: An Interesting Alternative To Nozzle Expansion;* AIAA paper 98-3918, Joint Propulsion Conference, Cleveland, Ohio, July 1998, incorporated herein by reference.

Figure 8:
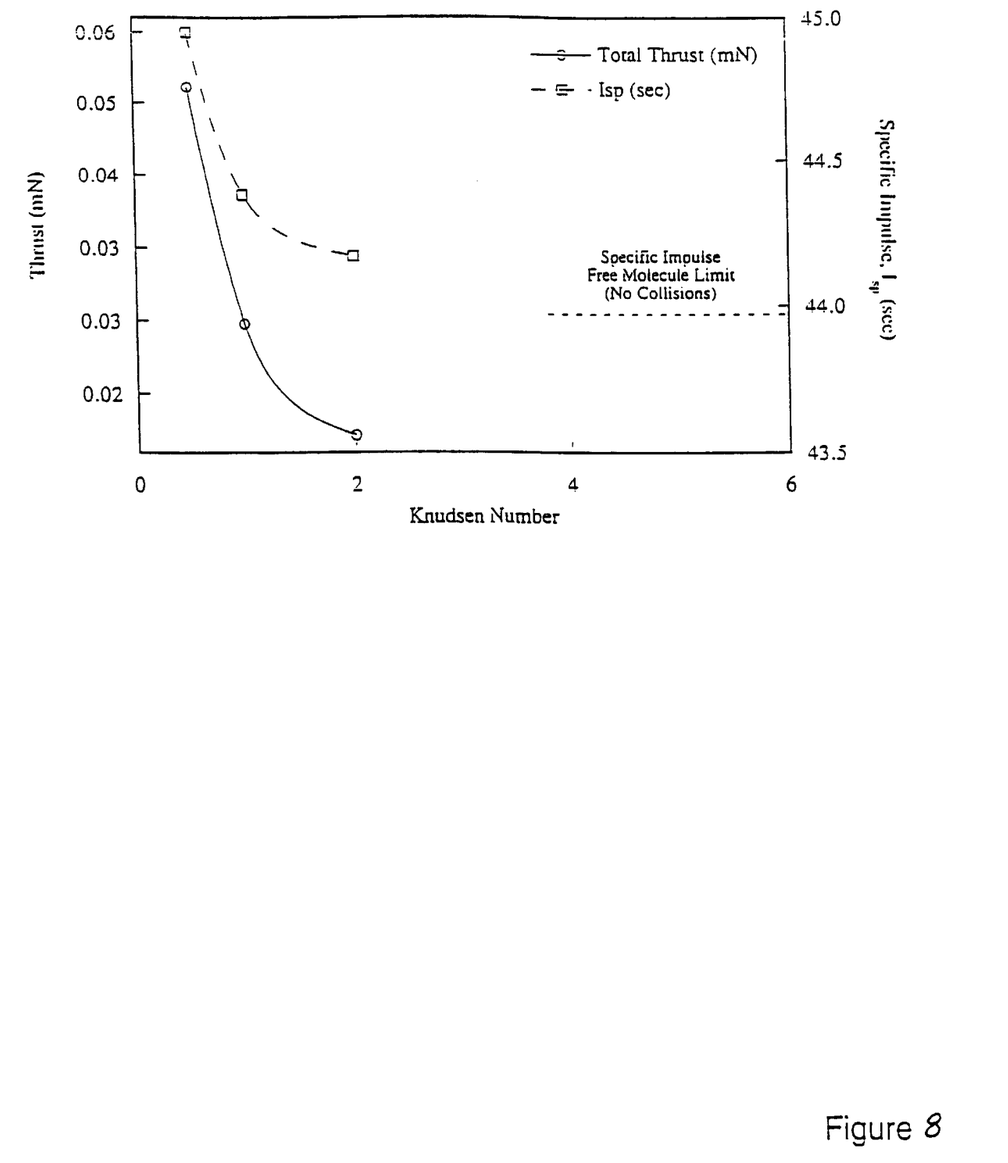
FIG. 8 is a graph relative to the performance of the compact thruster of the invention.

As mentioned in such paper, the compact thruster of the invention can be scaled to larger thrust levels by increasing the pressure (smaller Knudsen number for a constant slot width of 100 $\mu$m) in the stagnation region, as shown in FIG. 8 for $T_w$=600 K. The thrust is calculated assuming a single expansion slot 1 cm long. Very low values of thrust, which are important for incremental maneuvers and critical pointing, can be achieved by simply reducing the pressure in the stagnation region without sacrificing efficiency. Arbitrarily small impulse bits (I-bit) are possible by this strategy with easily achievable valve cycle times. FIG. 8 shows the effect on the specific impulse for $T_w$=600 K as the stagnation pressure is decreased or the Knudsen number increases. The calculated $I_{sp}$ of the compact thruster of the invention increases slightly as the Knudsen number decreases and will most likely asymptote to the value for a sonic, continuum orifice. As shown in FIG. 8, the enhanced performance comes at the expense of higher thrust for a constant slot width as the Knudsen number decreases. The impulse bit is based on the thrust and the valve actuation time implying that the higher thrust level requires a shorter valve response time for the same impulse bit. Since microspacecraft will require impulse bits on the order of $\mu$N-sec, reducing a microthruster's thrust level, without sacrificing much in specific impulse, is essential to maintain easily achievable valve actuation times. FIG. 8 indicates the flexiblity of the compact thruster of the invention in meeting several different mission requirements on the same spacecraft.

A DSMC parametric study, as noted in the above paper, was done to optimize the heating element pedestal width in terms of the thruster performance. As expected, the calculated specific impulse asymptoted to the free molecule theory value as the heated surface area increased. A pedestal width of 3w or 300 $\mu$m, in the above example, appeared to be a reasonable compromise between the performance and the input heating power cost.

Thus, the compact thruster of the invention operates at low pressures, easing valve requirements for leak rate and power required to actuate the valves. It operates on propellants that can be stored as a liquid or solid greatly reducing the mass and volume of propellant tanks. Since it operates on the propellant vapor pressure at moderate temperatures, large amounts of power are not required to heat the propellant for operation. The multiple expansion slot configuration adds the additional benefit of reduced catastrophic plugging by particulates over a single small throat in a nozzle configuration. The inventive compact thruster thus operates over a wide range of thrust levels without reductions in efficiency which cold gas thrusters can not accomplish.

The inventive compact thruster is a lightweight, rugged and readily fabricated propulsion system suitable for microspacecraft of up to 100 kg or more. The compact thruster is a microthruster useful for spacecraft attitude control, station-keeping and de-orbit maneuvering. The inventive thruster preferably has a heating element in the path of the propellant vapors to heat a gas expanding through long narrow slots, e.g., 1–50 cm by 1–100 microns.

As noted above, the microthruster of the invention can operate at low stagnation pressures. This permits the propellant vapors to have free molecular flow within the inventive thruster, which aids in directing the maximum number of gas molecules to a heating zone and then out the discharge opening or slots of the thruster. This makes for efficient propulsion while reducing the operating presure of the thruster which, in turn, alleviates the need for heavy propellant tanks and leak resistant valves.

Without free molecular flow, more gas molecules can collide with each other (than collide with thruster interior walls or a vapor heating element), sending such errant molecules out of the desired flow path, which can mean less efficient heating and discharge of propellant vapors.

The microthruster of the invention can be used in a wide variety of spacecraft maneuvers such as attitude control, station-keeping, constellation formation and de-orbit. For large synthetic aperture systems, such as space-based radar constellations of micro satellites, active propulsion is required to form the constellation and maintain accurate positioning between its members. Individual microsatellites also need to maintain fixed attitude with respect to each other and with ground stations. These tasks often require different levels of thrust from the on-board propulsion system. As noted above, the inventive thruster is capable of a wide range of thrust levels to accomplish these tasks with little or no loss of efficiency.

Similarly, the microthruster of the invention can be used in the formation and maintenance of constellations of commercial communication satellites and of individual satellite attitude control. All of these missions can be performed by a single thruster system without the need for separate high and low thrust propulsion systems. Also the ability of the inventive thruster to emit small impulse bits makes it suitable for fine satellite pointing missions.

What is claimed is:

1. A microthruster comprising, a housing having a) a fuel section and b) a discharge section,
   a) said fuel section having,
      1) a tank for propellant,
      2) a fuel outlet valve mounted on said tank and
      1) a plenum mounted on said tank and connecting with said valve,
   b) said discharge section being mounted over said plenum and having
      1) an apertured heating element and
      2) a plurality of ducts therethrough in alignment with at least some of the apertures in said heating element such that a plurality of passages extend from said plenum through said discharge section and
   means for opening said valve and means for heating said tank to drive expanding propellant vapors through said valve, into said plenum, through said apertures in said heating unit to heat and further expand such gas which then is driven through said ducts to discharge to provide thrust for said housing.

2. A microthruster comprising, a housing having a) a fuel section, b) a mid section and c) a discharge section in series,
   a) said fuel section having,
      1) a tank for propellant,
      2) a fuel outlet valve mounted on said tank and
      3) a plenum mounted on said tank and connecting with said valve,
   b) said mid section being mounted on said plenum and having,
      1) a bottom wall which is mounted over said plenum,
      2) an upper wall which forms a floor of said discharge section and
      3) passages through said bottom and upper walls which connect said plenum to said discharge section,
   c) said discharge section being mounted on said mid section and having
      1) side walls and an upper wall to define a stagnation chamber with said floor
      2) said upper wall having an discharge opening therein over said floor and means for opening said valve and means for heating said tank to drive expanding propellant vapors through said valve, into said plenum, through said passages and into said stagnation chamber, and means for further heating said vapors before discharge out said opening to provide thrust for said housing.

3. The microthruster of claim 2 having means for driving said vapors through said passages and into said stagnation chamber, to deflect off the walls thereof, including said floor and discharge out of said opening to provide thrust for said housing.

4. The microthruster of claim 2 having a heating element mounted on said floor below said discharge opening.

5. The microthruster of claim 2 having a pedestal mounted on said floor below said discharge opening and means for heating said tank to drive expanding propellant vapors through said valve, into said plenum, through said passages and into said stagnation chamber, to deflect off the walls thereof, including off said pedestal and discharge out through said opening to provide thrust for said housing.

6. The microthruster of claim 2 wherein a heating element is mounted on said pedestal.

7. The microthruster of claim 6 wherein said heating element and pedestal are indented on the top surface thereof.

8. The microthruster of claim 2 wherein a heating element is mounted in said discharge opening.

9. The microthruster of claim 8 wherein said discharge opening is bent to turn or baffle the vapor stream discharging therethrough.

10. The microthruster of claim 2 having an exterior belt means for heating said tank.

11. The microthruster of claim 2 wherein said mid-section has a lower insulative portion surmounted by an upper thermally conductive portion.

12. The microthruster of claim 2 having a gas filter mounted between said valve and said plenum.

13. The microthruster of claim 2 having at least one heating element mounted in one or more of said sections and passing said vapors into proximity or into contact with said heating element as they flow from said valve to exit said discharge opening.

14. The microthruster of claim 13 wherein said heating element is mounted in a location selected from the group of, in one or more of said passages, in said stagnation chamber and in said discharge opening.

15. The microthruster of claim 13 wherein said heating element is in a film.

16. The microthruster of claim 2 wherein said discharge opening is an expansion slot or orifice.

17. The microthruster of claim 16 wherein a plurality of said discharge openings are mounted in a discharge plate.

18. The microthruster of claim 17 wherein said discharge plate has an insulative coating on the top side thereof.

* * * * *